(12) United States Patent
Simon

(10) Patent No.: US 11,960,829 B1
(45) Date of Patent: Apr. 16, 2024

(54) FAST INPUT WINDOW

(71) Applicant: SAP SE, Walldorf (DE)

(72) Inventor: Patrick Simon, Beckingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/070,926

(22) Filed: Nov. 29, 2022

(51) Int. Cl.
*G06F 3/0482* (2013.01)
*G06F 16/22* (2019.01)
*G06F 40/174* (2020.01)
*G06F 40/177* (2020.01)

(52) U.S. Cl.
CPC .......... *G06F 40/177* (2020.01); *G06F 3/0482* (2013.01); *G06F 16/2282* (2019.01); *G06F 40/174* (2020.01)

(58) Field of Classification Search
CPC ... G06F 16/2282; G06F 3/0482; G06F 40/174
See application file for complete search history.

(56) References Cited

U.S. PATENT DOCUMENTS

| | | | |
|---|---|---|---|
| 2016/0225271 A1* | 8/2016 | Robichaud | G06F 40/177 |
| 2019/0065456 A1* | 2/2019 | Platow | G06F 3/04895 |
| 2020/0302013 A1* | 9/2020 | Stegmaier | G06F 40/18 |
| 2020/0342404 A1* | 10/2020 | Jackson | G06Q 30/016 |
| 2022/0391580 A1* | 12/2022 | Middendorf | G06F 16/2282 |
| 2023/0049621 A1* | 2/2023 | Lee | G06F 40/143 |
| 2023/0252229 A1* | 8/2023 | Kim | G06F 40/174 |
| | | | 715/224 |

* cited by examiner

*Primary Examiner* — Dino Kujundzic
(74) *Attorney, Agent, or Firm* — Buckley, Maschoff & Talwalkar LLC

(57) ABSTRACT

Provided are systems and methods for simplifying a user interaction when inputting data into multiple pages/windows of a software application. In one example, the method may include executing a software application, displaying a plurality of rows of data values from columns of a database table via a user interface embedded in a page of the software application, detecting a request for a fast input submitted via the user interface, and in response to the detected request, displaying a plurality of interactive elements within the plurality of rows of data values on the user interface, and detecting a selection of an interactive element from among the plurality of interactive elements, and in response, displaying a fast input user interface with input fields extracted from one or more other pages of the software application via the user interface.

20 Claims, 15 Drawing Sheets

FIG. 2A

Orders (19) — 200

Search Orders...

| Order ID 201 | Order Date 202 | Customer Name 203 | Ship Address 204 | Ship City 205 |
|---|---|---|---|---|
| 10248 | 10-23-2022 | Susan Grobin | 117 Creek Ln. | Frankfurt |
| 10312 | 10-24-2022 | Steven Dobbs | 79 Nall Rd. | Middletown |
| 10333 | 10-17-2022 | Angela Bass | 65 Gray Rd. | Orlando |
| 10358 | 9-30-2022 | David Rove | 8 Violet Ln. | New York |
| 10407 | 10-12-2022 | Anne Kemper | 22 Rue Blanc | Leon |
| 10423 | 9-15-2022 | Louise Krumholt | 3 Round Tree Pl. | Jamestown |
| 10446 | 10-07-2022 | Brad Green | 60 Route 56 Hwy | Scranton |
| 10472 | 10-11-2022 | Thomas Ruleman | 55 Padman Rd. | London |
| ... | | ... | | ... |

< Order Detail

Order ID: 10248

Order Date:
October 23, 2022

Customer:
Susan Grobin

211 ─ Customer   Product Details ─ 212

Data Entry Section 220

Name: ─ 221
Address: ─ 222
Zip Code: ─ 223

City: ─ 224
State: ─ 225
Country: ─ 226

Orders (19) 300A

[ Fast Input ] — 302
ⓘ — 304

Search Orders... 🔍

| Order ID (311/312) | Order Date (312) | Customer Name (313) | Ship Address (314) | Ship City (315) | (316) |
|---|---|---|---|---|---|
| 10248 (331) | 10-23-2022 | Susan Grobin | 117 Creek Ln. | Boston | > |
| 10312 | 10-24-2022 | Steven Dobbs | 79 Nall Rd. | Middletown | > |
| 10333 | 10-17-2022 | Angela Bass | 65 Gray Rd. | Orlando | > |
| 10358 | 9-30-2022 | David Rove | 8 Violet Ln. | New York | > |
| 10407 | 10-12-2022 | Anne Kemper | 22 Rue Blanc | Paris | > |
| 10423 | 9-15-2022 | Louise Krumholt | 3 Round Tree Pl. | Jamestown | > |
| 10446 | 10-07-2022 | Brad Green | 60 Route 56 Hwy | Scranton | > |
| 10472 | 10-11-2022 | Thomas Ruleman | 55 Padman Rd. | London | > |
| ⋮ | | ⋮ | | | |

FIG. 3B

Orders (19)

[302] Fast Input  [304] (i)  Search Orders...

| Order ID [311] | Order Date [312] | Customer Name [313] | Ship Address [314] | Ship City [315] |
|---|---|---|---|---|
| 10248 | 10-23-2022 | Susan Grobin | 117 Creek Ln. | Boston |
| 10312 | 10-24-2022 | Steven Dobbs | 79 Nall Rd. | Middletown |
| 10333 | 10-17-2022 | Angela Bass | 65 Gray Rd. | Orlando |
| 10358 | 9-30-2022 | David Rove | 8 Violet Ln. | New York |
| 10407 | 10-12-2022 | Anne Kemper | 22 Rue Blanc | Paris |
| 10423 | 9-15-2022 | Louise Krumholt | 3 Round Tree Pl. | Jamestown |
| 10446 | 10-07-2022 | Brad Green | 60 Route 56 Hwy | Scranton |
| 10472 | 10-11-2022 | Thomas Ruleman | 55 Padman Rd. | London |

Orders (19)

| Order ID | Order Date | Customer Name | | | | |
|---|---|---|---|---|---|---|
| 10248 | 10-23-2022 | Susan Grobin | | | | |
| 10312 | 10-24-2022 | Steven Dobbs | | | | |
| 10333 | 10-17-2022 | Angela Bass | | | | |
| 10358 | 9-30-2022 | David Rove | 8 Violet Ln. | New York | | |
| 10407 | 10-12-2022 | Anne Kemper | 22 Rue Blanc | Paris | | |
| 10423 | 9-15-2022 | Louise Krumholt | 3 Round Tree Pl. | Jamestown | | |
| 10446 | 10-07-2022 | Brad Green | 60 Route 56 Hwy | Scranton | | |
| 10472 | 10-11-2022 | Thomas Ruleman | 55 Padman Rd. | London | | |

Fast Input — 302
304
311 — Order ID
312 — Order Date
313 — Customer Name

Information Window 320

You can define up to 3 input fields as fast inputs with this control.

Please navigate to a page detail and activate fields as "fast input" fields with the ✎ icon.

The ✎ icon can also be used to edit entries on this page. The number in the dot shows if there are empty fields.

Orders (19)

[Fast Input] button (302), info icon (304)

| Order ID (311) | Order Date (312) | Customer Name (313) | Ship Address (314) | Ship City (315) |
|---|---|---|---|---|
| 10248 | 10-23-2022 | Susan Grobin | 117 Creek Ln. | Boston |
| 10312 | 10-24-2022 | Steven Dobbs | 79 Nall Rd. | |
| 10333 | 10-17-2022 | Angela Bass | 65 Gray Rd. | |
| 10358 | 9-30-2022 | David Rove | 8 Violet Ln. | |
| 10407 | 10-12-2022 | Anne Kemper | 22 Rue Blanc | |
| 10423 | 9-15-2022 | Louise Krumholt | 3 Round Tree P | |
| 10446 | 10-07-2022 | Brad Green | 60 Route 56 Hw | |
| 10472 | 10-11-2022 | Thomas Ruleman | 55 Padman Rd. | London |

Search Orders ...

Fast Input Window 330
Price: 332
Zip Code: 334
Save / Cancel 300D
308

FIG. 3E

Orders (19)

[Fast Input] — 302
(i) — 304

Search Orders...

| Order ID | Order Date | Customer Name | Ship Address | Ship City | | |
|---|---|---|---|---|---|---|
| 10248 | 10-23-2022 | Susan Grobin | 117 Creek Ln. | Boston | ✏ | ∨ |
| 10312 | 10-24-2022 | Steven Dobbs | 79 Nall Rd. | Middletown | ✏ | ∨ |
| 10333 | 10-17-2022 | Angela Bass | 65 Gray Rd. | Orlando | ✏ | ∨ |
| 10358 | 9-30-2022 | David Rove | 8 Violet Ln. | New York | ✏ | ∨ |
| 10407 | 10-12-2022 | Anne Kemper | 22 Rue Blanc | Paris | ✏ | ∨ |
| 10423 | 9-15-2022 | Louise Krumholt | 3 Round Tree Pl. | Jamestown | ✏ | ∨ |
| 10446 | 10-07-2022 | Brad Green | 60 Route 56 Hwy | Scranton | ✏ | ∨ |
| 10472 | 10-11-2022 | Thomas Ruleman | 55 Padman Rd. | London | ✏ | ∨ |
| ... | | | | | | |

311 — Order ID
312 — Order Date
313 — Customer Name
314 — Ship Address
315 — Ship City
331
300E

FIG. 3F

Order Detail

Order ID: 10248

Order Date:
October 23, 2022

Customer:
Susan Grobin

Customer  Product Details

Data Entry Section 350

Name: 351
Address: 352
Zip Code: 353

City: 354
State: 355
Country: 356

Orders (19)

Fast Input

| Order ID | Order Date | Customer Name | Ship Address | Ship City |
|---|---|---|---|---|
| 10248 | 10-23-2022 | Susan Grobin | 117 Creek Ln. | Boston |
| 10312 | 10-24-2022 | Steven Dobbs | 79 Nall Rd. | |
| 10333 | 10-17-2022 | Angela Bass | 65 Gray Rd. | |
| 10358 | 9-30-2022 | David Rove | 8 Violet Ln. | |
| 10407 | 10-12-2022 | Anne Kemper | 22 Rue Blanc | |
| 10423 | 9-15-2022 | Louise Krumholt | 3 Round Tree P | |
| 10446 | 10-07-2022 | Brad Green | 60 Route 56 Hw | |
| 10472 | 10-11-2022 | Thomas Ruleman | 55 Padman Rd. | |

Search Orders ...

Fast Input Window 330b

Price: 381
Zip Code: 353
Country: 356

Save  Cancel

FIG. 3H

‹ Order Detail

Order ID: 10248

Order Date:
October 23, 2022

Customer:
Susan Grobin

Product Details

Customer

Data Entry Section 380

Price: 381

Quantity: 382

Ship Date: 383

FIG. 3I

Orders (19) _300i_

Fast Input _302_
(i) _304_

Search Orders... 🔍

| Order ID _311_ | Order Date _312_ | Customer Name _313_ | Ship Address _314_ | Ship City _315_ |
|---|---|---|---|---|
| 10248 | 10-23-2022 | Susan Grobin | 117 Creek Ln. | Boston |
| 10312 | 10-24-2022 | Steven Dobbs | 79 Nall Rd. | |
| 10333 | 10-17-2022 | Angela Bass | 65 Gray Rd. | |
| 10358 | 9-30-2022 | David Rove | 8 Violet Ln. | |
| 10407 | 10-12-2022 | Anne Kemper | 22 Rue Blanc | |
| 10423 | 9-15-2022 | Louise Krumholt | 3 Round Tree P | |
| 10446 | 10-07-2022 | Brad Green | 60 Route 56 Hw | |
| 10472 | 10-11-2022 | Thomas Ruleman | 55 Padman Rd. | |

_308_

Fast Input Window _330c_

Price: _383_

Zip Code: _353_

Country: _356_

Quantity: _382_

[Save] [Cancel]

FIG. 4

Orders (19)                                    [Fast Input] — 402
                                                   (i) — 404
                                                   [Search Orders ...]

| Order ID (411) | Order Date (412) | Customer Name (413) | Ship Address (414) | Ship City (415) |
|---|---|---|---|---|
| 10248 | 10-23-2022 | Susan Grobin | 117 Creek Ln. | Boston |
| 10312 | 10-24-2022 | Steven Dobbs | 79 Nall Rd. | Middletown |
| 10333 | 10-17-2022 | Angela Bass | 65 Gray Rd. | Orlando |
| 10358 | 9-30-2022 | David Rove | 8 Violet Ln. | New York |
| 10407 | 10-12-2022 | Anne Kemper | 22 Rue Blanc | Paris |
| 10423 | 9-15-2022 | Louise Krumholt | 3 Round Tree Pl. | Jamestown |
| 10446 | 10-07-2022 | Brad Green | 60 Route 56 Hwy | Scranton |
| 10472 | 10-11-2022 | Thomas Ruleman | 55 Padman Rd. | London |

420, 421, 422 — 400

FAST INPUT WINDOW

BACKGROUND

A table is a collection of related data that is held in a tabular form that includes vertical columns and horizontal rows. Each row usually corresponds to a unique record and each column corresponds to a different field in that record. A software application may be used to fill-in data within the tables with content such as values and other attributes. To enable data entry, the software application may output a user interface with input fields for inputting data via an input mechanism (e.g., keyboard, mouse, touch, voice, etc.) which is to be stored within the table.

For more complex data applications, the input fields are often spread across multiple different pages of the software application. As a result, the user often needs to navigate to multiple different pages in order to input the necessary data. The added time and inefficiency that is caused by having to navigate to the different pages is compounded when a user has to repeat the data entry process throughout the day. Another drawback is that a user may not need to input data into every field within the user interface. Instead, only some of the fields may be needed. Therefore, a user must identify which input fields are needed for entry and which input fields are not, which also creates more inefficiency.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIGS. 2A-2B are diagrams illustrating a related process of inputting data.

FIGS. 3A-3I are diagrams illustrating a process of inputting data based on a fast input window in accordance with example embodiments.

FIG. 4 is a diagram illustrating a process of displaying an indicator within an interactive element in accordance with example embodiments.

Figure 1:
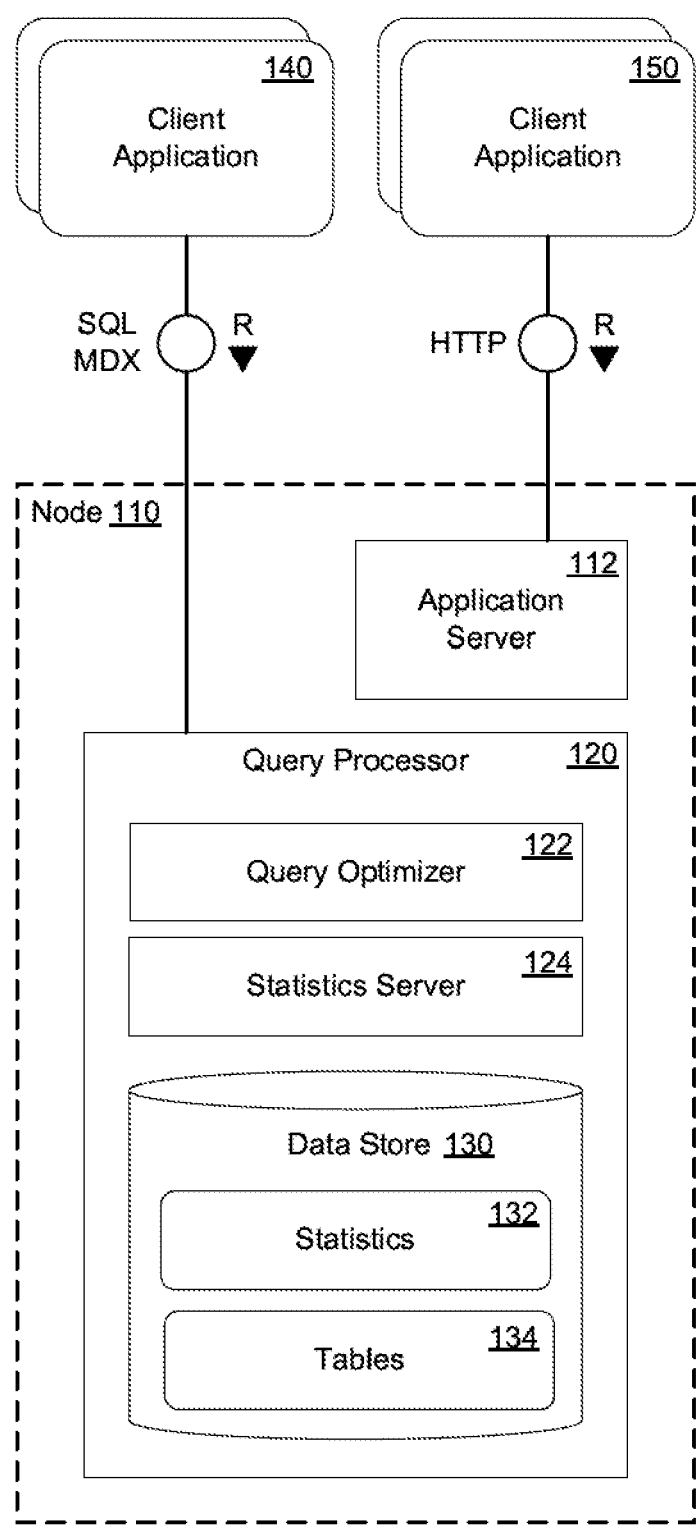
FIG. 1 is a diagram illustrating an example of a database system for accessing table data in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Tables are database objects that store data in a predefined format which typically includes a plurality of rows arranged vertically and a plurality of columns arranged horizontally. The combination of rows and columns essentially creates a two-dimensional array of data values. When viewed as a whole, a database table can appear like a large block of numbers or other values which can be difficult to understand to a viewer. It can be even more difficult to view the table data when the user is on a device with a smaller viewing display screen such as a mobile phone, tablet, smart wearable device, or the like.

Software applications that enable viewers to visualize and enter data (e.g., into a database table, etc.) may often provide a series of workflows for entering data including multiple windows/display screens with different input fields for data entry. For example, when entering data into input fields of a workflow of a software application, the user may need to navigate to multiple different pages of the software application for entering the necessary data. As an example, the data necessary for ordering a product may require a user to visit a product details page, an order details page, a contact details page, and the like, which may be embodied in different pages of the software application. A user may navigate to these other pages and obtain the necessary data, then return to the data entry page. However, this process if very inefficient. Furthermore, the inefficiencies are magnified when the user must repeat the process throughout their day.

The example embodiments overcome the drawbacks noted above via a special "fast input" control which enables a user to complete data entry tasks without having to navigate to different pages of a software application for data entry. Instead, while the user is entering data values into a first page of the software application, the user can open the fast input window and access input fields on another page or pages of the software application. The fast input window is a pop-up display that does not require the user to navigate to a different page. Rather, the user can stay on the initial page and also open up the pop-up window and enter data values into input fields of other pages of the software application. That is, input fields stored on other pages within the software application can be integrated into the fast input window and made accessible for data entry while the user is accessing a different page of the software application. The fast input window may include input fields from other pages of the software application. However, because the fast input window is a pop-up window, the user does not need to navigate away from the first page of the software application thereby saving the user time.

The user can configure the fast input window during an initial use or subsequent use of the software application. For example, the user can select which fields from which pages of the software application are to be included in the fast input window using an input mechanism. The fast input window may include input fields from multiple different pages of the software application embodied within one single window (fast input window).

The fast input control may be activated with a toggle button above a table on a list report" page or the like. For example, the user may click on the toggle button to activate the fast input control. After clicking on the toggle button, an additional table column may be displayed with edit buttons (de-active) for each table row. For example, the user may click on a table row, and the application may navigate to a corresponding "Object" page. On this page, a button for adding the input fields to the fast input window is visible next to each input field. The user can now define which input fields will be included as fast input fields. Back on the list report page, the edit buttons are now active. When clicking on the respective button, the input fields previously marked as fast input field are now visible in a small popup window (fast input window). If a fast input field within the window is determined to be empty, the edit button may be visually marked with a notification and also a numerical identifier indicating how many of the fields within the fast input window are not filled in. The user can check the entries by clicking on the corresponding edit button or add entries if they are empty.

FIG. 1 illustrates an example of a database system 100 according to some embodiments. The database system 100 may access table data and display the table data via a user interface of client applications 140 and 150. It should be appreciated that a database architecture of the present application is not limited to the architecture shown in FIG. 1.

Referring to FIG. 1, the database system 100 may include a node 110 (e.g., a database node, a server node, a virtual machine, etc.) which may be part of a larger group of nodes. Generally, the node 110 may receive a query (e.g., SQL query, OQL query, XQuery, etc.) from any of the client applications 140 and 150 and return results thereto based on data stored within a data store 130 of the node 110. In this example, the node 110 may execute program code to provide an application server 112 and query processor 120. The application server 112 provides services for executing server applications. For example, Web applications executing on an application server may receive Hypertext Transfer Protocol (HTTP) requests from client applications 150 as shown in FIG. 1.

Query processor 120 may include the stored data and engines for processing the data. In this example, query processor 120 is responsible for processing Structured Query Language (SQL) and Multi-Dimensional eXpression (MDX) statements and may receive such statements directly from client applications 140.

Query processor 120 includes a query optimizer 122 for use in determining query execution plans and a statistics server 124 for determining statistics used to estimate query execution plan costs. The statistics server 124 may generate such statistics based on other stored statistics as described herein including histograms with distinct value sketches integrated therein. For example, in response to reception of a query consisting of a conjunct of several predicates on a stored table (or view) of the node 110, the statistics server 124 may estimate selectivity of the query based on known selectivities of various conjuncts of the query predicates.

In some embodiments, underlying database data capable of being queried may be stored in a data store 130 that includes tables 134 such as row-based data, column-based data, and object-based data. Here, the tables 134 may store database content that is accessible to the client applications 140 and 150 In addition, the data store 130 may include statistics 132 such as the histograms/histogram objects described herein which include the distinct value sketches integrated therein. Buckets within the histogram objects may be generated based on rows/columns of data from the tables 134. Furthermore, the data within the tables 134 may be indexed and/or selectively replicated in an index (not shown) to allow fast searching and retrieval thereof. The node 110 may support multi-tenancy to separately support multiple unrelated clients by providing multiple logical database systems which are programmatically isolated from one another.

In some embodiments, the node 110 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

In some embodiments, when the query processor 120 receives a database query from one of the client applications 140 and 150, the query processor 120 may trigger the query optimizer 122 to generate a query execution plan for the database query. The query optimizer 122 may access one or more histograms (with distinct value sketches embedded therein) from the data store 130 (e.g., statistics 132) to identify statistics of the database associated with the data to be queried. This data can then be used by the query optimizer 122 to generate an accurate query execution plan for the database query. Here, the query optimizer 122 uses the statistics 132 including the histograms described herein to calculate costs of each query. The generated query execution plan can then be executed to carry out the database query on the tables 134 and return the results to the client applications 140 and 150.

The client applications 140 and 150 may include user interfaces that may employ the fast input window that is described herein. For example, data that is queried from the tables 134 may be viewed in tabular format or spreadsheet format via a user interface of any of the client applications 140 and 150. The fast input window that is described herein may be implemented within native user interface elements of the client applications 140 and 150. In some embodiments, the fast input window may be implemented into the client applications 140 and 150 within a library, code module, software update or patch, etc., which is made available to developers of the client applications 140 and 150.

In some cases, a table may contain more columns of data that can be visually displayed on the screen in a comprehensible manner to a viewer. In this case, a user can activate a fast input window which displays input fields from other pages of the software without requiring the user to navigate to those pages. Thus, the user can fill-in the input fields with data values without having to actually navigate to those pages thereby saving the user time.

FIGS. 2A-2B are diagrams illustrating a related process of inputting data. FIG. 2A illustrates a user interface 200 within a plurality of columns 201, 202, 203, 204, and 205 of data values arranged in rows. Each row of data in the user interface 200 corresponds to a different data record from an underlying database table. Here, each data record corresponds to a purchase order. The user interface also provides a navigation arrow 206 which enables the viewer to navigate to another page of the application for inputting data. For example, if the user were to move a cursor 207 or other input mechanism over the navigation arrow 206 and click on it, the application may open a user interface 210 as shown in FIG. 2B.

Referring to FIG. 2B, the user interface 210 includes a data entry page 220 with a plurality of fields 221, 222, 223, 224, 225, and 226, for inputting data into the user interface 210. The input data may be saved into an underlying database table or the like by selecting a SAVE command, etc. However, the user must navigate back and forth between the user interface 200 shown in FIG. 2A for viewing the overall order and to the user interface 210 for inputting details about the order. Furthermore, the data entry page 220 corresponds to a tab 211 in the user interface 210. If the user wants to add additional data into a product section of the application, the user must access another page (product tab 212).

FIGS. 3A-3H are diagrams illustrating a process of inputting data based on a fast input window in accordance with example embodiments. In the examples herein, the fast input window is a pop-up window that can be overlaid on content within a user interface. As a result, it is not necessary to navigate to a different page or even move a field of view of the software application to access the fast input window.

FIG. 3A illustrates a user interface 300A which is similar to the user interface 200 shown in FIG. 2A. For example, the user interface 300A includes a plurality of columns 311, 312, 313, 314, and 315 of data values arranged in rows. Each row 331 of data in the user interface 300A corresponds to a different data record such as a purchase order. The user interface also provides a navigation arrow 316 which enables the viewer to navigate to another page of the application for inputting data. For example, if the user were to move a cursor or other input mechanism over the navigation arrow 316 and click on it, the application may open a user interface 210 as shown in FIG. 2B.

In addition, the user interface 300A also includes features that are not present in the user interface 200 of FIG. 2A. For example, the user interface 300A includes a fast input button 302 and an information button 304 embedded within a frame or template of the user interface 300A. The fast input button 302 may include different appearances depending on whether the fast input process is activated or not. If a user were to select the fast input button 302 in FIG. 3A, it would change the user interface 300A to the user interface 300B shown in FIG. 3B. For example, the user may use an input mechanism such as a touch input on a screen, a keyboard input, a mouse input, or the like, to depress the fast input button 302 or otherwise make a selection via some other control means such as a radio button, menu, etc.

In response to the fast input button 302 being pressed, the user interface 300B may activate a plurality of interactive elements 308 which including navigation links. For example, each interactive element 308 may contain a navigation link to another page of the software application. In this example, each interactive element 308 may contain a link to a data entry page for each respective record within the table of data shown in the user interface 300B. For example, an interactive element arranged in the row of the data record corresponding to Steven Dobbs, may contain a link to a data entry page for entering contact details of the user Steven Dobbs. The other interactive elements may have similar links to respective data entry pages for the other records.

In addition to activating the interactive elements 308, the user interface 300B may also change an appearance of the fast input button 302 to indicate that it has been activated. For example, the user interface 300B may highlight the fast input button 302, change a shading, change a color, change a shape, change a size, and/or the like, of the fast input button 302 to indicate that it has been activated.

The user may be new to the fast input process. If the user were to press or otherwise select the information button 304, the user interface 300B may change to the user interface 300C shown in FIG. 3C. Here, the user interface 300C detects selection of the information button 304 and outputs a pop-up window 320 with additional information about the fast input process including descriptions of what different elements on the user interface represent and their function. The pop-up window 320 can be closed by clicking on the information button 304 again or by waiting a predetermined amount of time (e.g., 10 seconds) after which the pop-up window 320 is automatically closed.

FIG. 3D illustrates a user interface 300D in which a fast input window has been activated. Here, the user may select an interactive element 308 within the user interface where the fast input process is activated. In response, the user interface 300D may display a fast input window 330 which is a pop-up window that is overlaid on content within the user interface 300D and which includes input fields 381 and 353 from one or more other pages of the software application. The fast input window 330 may include a filled-in background the blocks underlying content and enables the input fields 381 and 353 to be interactive with and for data values to be entered therein. The user may enter input data into either of the input fields 381 and 353 and save the data to the underlying database table without having to navigate to a corresponding page where the input fields 381 are located. For example, the input fields 381 and 353 may be extracted from a customer contact information page, a product entry page, or the like. It should be appreciated that the user may click on or otherwise select an interactive element 308 of any of the rows/record within the table and a similar fast input window will pop-up. However, the data will be stored in a different location in the database table corresponding to the different record/user.

FIG. 3E illustrates an example of a user interface 300E in which the fast input window 330 for fast input has been closed and the interactive elements 308 for fast input remain active. Here, a user can press on a row 331 of the table data within the user interface 300E to modify or otherwise configure the fast input window 330 that is shown in FIG. 3D. In response, the user interface 300E may detect the depress on the row 331 and navigate to a second page of the software application represented by user interface 300F shown in FIG. 3F.

Referring to FIG. 3F, the user interface 300F includes an order details page for entering details about an order for a product. The order details page includes a data entry section 350 with input fields 351, 352, 353, 354, 355, and 356 capable of receiving data inputs and transferring the data inputs to a database table. The input fields 351, 352, 353, 354, 355, and 356 may include mappings or pointers to different partitions, tables, columns, etc. within an underlying database.

According to various embodiments, an interactive element 360 may be displayed next to each of the input fields 351-356. The interactive element 360 may be a mechanism for selecting which input fields are to be embodied within the fast input window 330 shown in FIG. 3D. Here, the user may select an interactive element 360f thereby selecting a corresponding input field 356 for inclusion in the fast input window 330. That is, the interactive element 360 may be displayed next to an input field on a different page of the software application and it may be selected in order to add the input field to a fast input window that pops-up via a different/previous page within the software application workflow.

Referring now to FIG. 3G, if the user were to subsequently select the interactive element 308 of the row 331 within a user interface 300G, the user interface 300G may output a modified fast input window 330*b* which now includes the input field 356 therein. The input field 356 may include a rectangular box or other input field which is capable of receiving text input from a keyboard and which includes a pointer to an underlying storage location such as a table or a database record. The input field 356 may also include its identifier such as the name of the field which is displayed next to it. Likewise, the user may also choose to remove input fields from the fast input window by unchecking the interactive element 360 corresponding to the input field within its corresponding entry page.

According to various embodiments, the software may include logic that enables graphical user interface elements such as input fields and the name displayed next to the fields to be added to a pop-up window on another page of the application. The input fields may include text input fields such as alphanumeric text content. The input fields may include pointers to underlying storage locations within a database and/or a database table. When the user enters text input into the fields within the fast input user interface it is as if the user were inputting the text input into the fields on the original data entry page because the pointers to the underlying storage locations are included.

Furthermore, input fields from multiple different pages and data entry sections of the application workflow may be added to the fast input window. For example, FIG. 3H illustrates a user interface 300H with a data entry section 380 for entering product details into the data record stored in the database. Here, the data entry section 380 can be navigated to by checking the product details button above the data entry section 380. The data entry section 380 includes input fields 381, 382, and 383. Input field 381 is currently included in the fast input window. To indicate that the input field 381 is currently in the fast input window, the user interface 300H may highlight an interactive element 360*g* corresponding to the input field 381 to indicate that this field is currently included in the fast input window.

Here, the user may select the interactive element 360*h* corresponding to the input field 382 thereby causing the input field 382 to appear in the fast input window the next time the fast input window is opened such as shown in the user interface 300I of FIG. 3I. In this example, the user interface 300I includes a modified fast input window 330*c* with an additional input field 382 for quantity therein. The user may enter values into the modified fast input window 330*c* for any of the input fields displayed therein and press a save button to store the input data values within the underlying database/table.

FIG. 4 illustrates a process of displaying an indicator within an interactive element in accordance with example embodiments. Referring to FIG. 4, a user interface 400 includes data records displayed within a content section thereof including columns 411, 412, 413, 414, and 415 of data values. The user interface 400 also includes a fast input button 402 which may be selected/activated by a user and an information button 404. For example, in response to the fast input button 402 being detected, the user interface 400 may display a plurality of interactive elements within the plurality of rows of data. Here, an interactive element 420 may be displayed in all rows where the data record is complete. For rows where the data record is not complete (i.e., one or more input fields are missing values), the user interface 400 may display an interactive element 421 with an indicator 422 which indicates that one or more input fields still need to be completed. In addition, the indicator 422 may include a numerical value displayed inside a selection area thereof with an identifier of how many fields still need values. As a result, a viewer can quickly identify which records need attention and which do not.

Figure 5:
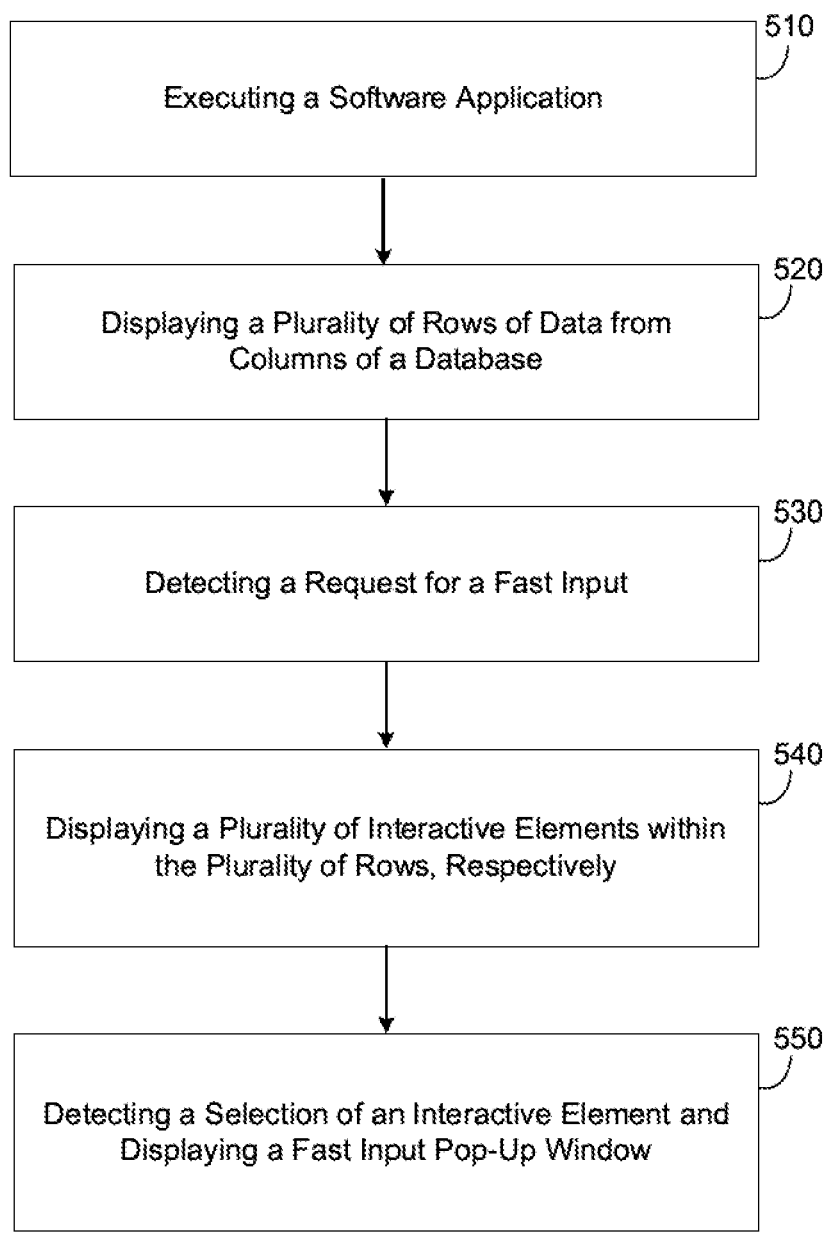
FIG. 5 is a diagram illustrating a method of providing a fast input window in accordance with an example embodiment.

FIG. 5 illustrates a method 500 of implementing a control overlay for a user interface element in accordance with an example embodiment. As an example, the method 500 may be performed by a web server, a cloud platform, an on-premises server, a database node included within a distributed database system, a user device, and the like. Referring to FIG. 5, in 510, the method may include displaying data values from a subset of columns of a table via a user interface. For example, a part of the table itself may be displayed or the content from the table may be visualized in tabular manner.

In 520, the method may include displaying a plurality of rows of data values from columns of a database table via a user interface embedded in a page of the software application. In 530, the method may include detecting a request for a fast input submitted via the user interface. In 540, the method may include, in response to the detected request, displaying a plurality of interactive elements within the plurality of rows of data values on the user interface. In 550, the method may include detecting a selection of an interactive element from among the plurality of interactive elements, and in response, displaying a fast input user interface with input fields extracted from one or more other pages of the software application via the user interface.

The plurality of interactive elements may be interactive in that they can be selected. In response to a selection, a fast input user interface is displayed. In some embodiments, the displaying the plurality of interactive elements may include activating a display of the plurality of interactive elements within the plurality of rows in response to detecting a selection of a fast input request button via the user interface. In some embodiments, the method may further include changing an appearance of the fast input request button within the user interface to indicate that the plurality of interactive elements are currently activated.

In some embodiments, the method may further include detecting a selection of a row from among the plurality of rows via the user interface, and in response displaying a second page of the software application and one or more input fields included in the second page of the software application. In some embodiments, the method may further include detecting a selection of an input field from among the plurality of input fields included in the second page of the software application, and adding the selected input field to the fast input user interface. In some embodiments, the method may further include detecting a selection of an additional input field via a third page of the software application, and in response, adding the additional selected input field to the fast input user interface which includes the input field from the second page of the software application.

In some embodiments, the method may further include displaying an indicator within an interactive element which indicates that one or more input fields in the fast input user interface is not completed. In some embodiments, the method may further include displaying a numeric identifier inside an area of the indicator which indicates a number of input fields that are not completed within the fast input user interface.

Figure 6:
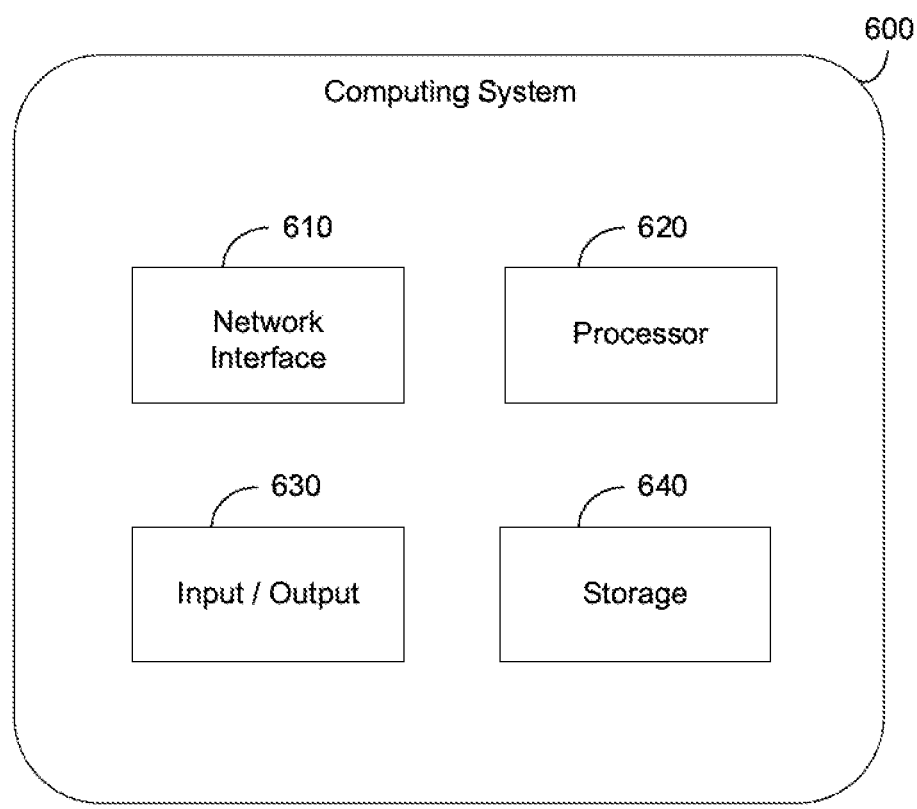
FIG. 6 is a diagram illustrating a computing system for use in the embodiments that are described herein.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. In some embodiments, the storage 640 may include a data store having a plurality of tables, database tables, records, partitions and sub-partitions. The storage 640 may be used to store database records, documents, entries, and the like. As another example, the storage may store an executable of a software application that is configured to implement the fast input window described in the example embodiments.

For example, the processor 620 may execute a software application, and display a plurality of rows of data values from columns of a database table via a user interface embedded in a page of the software application. The processor 620 may detect a request for a fast input submitted via the user interface. In response to the detected request, the processor 620 may display a plurality of interactive elements within the plurality of rows of data values on the user interface. The processor 620 may detect a selection of an interactive element from among the plurality of interactive elements, and in response, display a fast input pop-up window with input fields extracted from one or more other pages of the software application via the user interface.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to execute a software application, wherein execution of the software application is to:
display a plurality of rows of data values from columns of a database table via a user interface embedded in a page of the software application,
detect a request for a fast input submitted via the user interface,
in response to the detected request, display a plurality of interactive elements within the plurality of rows of data values on the user interface, and
detect a selection of an interactive element from among the plurality of interactive elements, and in response, display a fast input pop-up window with input fields from one or more other pages of the software application via the user interface, each of the input fields including a mapping or pointer to one or more partitions, tables, columns within an underlying database, each of the input fields having been previously selected for inclusion in the first pop-up window responsive to a user selection.

2. The computing system of claim 1, wherein execution of the software application is to further activate a display of the plurality of interactive elements within the plurality of rows in response to detecting a selection of a fast input request button via the user interface.

3. The computing system of claim 2, wherein execution of the software application is to further change an appearance of the fast input request button within the user interface to indicate that the plurality of interactive elements are currently activated.

4. The computing system of claim 1, wherein execution of the software application is to further detect selection of a row from among the plurality of rows via the user interface, and in response display a second page of the software application and one or more input fields included in the second page of the software application.

5. The computing system of claim 4, wherein execution of the software application is to further detect selection of an input field from among the one or more input fields included in the second page of the software application, and add the selected input field to the fast input pop-up window.

6. The computing system of claim 5, wherein execution of the software application is to further detect a selection of an additional input field via a third page of the software application, and in response, add the additional selected input field to the fast input pop-up window which includes the input field from the second page of the software application.

7. The computing system of claim 1, wherein execution of the software application is to further display an indicator within an interactive element which indicates that one or more input fields in the fast input pop-up window is not completed.

8. The computing system of claim 7, wherein execution of the software application is to further display a numeric identifier inside an area of the indicator which indicates a number of input fields that are not completed within the fast input pop-up window.

9. A method comprising:
executing a software application, wherein execution of the software application is to perform:
displaying a plurality of rows of data values from columns of a database table via a user interface embedded in a page of the software application;
detecting a request for a fast input submitted via the user interface,
in response to the detected request, displaying a plurality of interactive elements within the plurality of rows of data values on the user interface; and
detecting a selection of an interactive element from among the plurality of interactive elements, and in response, displaying a fast input pop-up window with input fields from one or more other pages of the software application via the user interface, each of the input fields including a mapping or pointer to one or more partitions, tables, columns within an underlying database, each of the input fields having been previously selected for inclusion in the first pop-up window responsive to a user selection.

10. The method of claim 9, wherein the displaying the plurality of interactive elements comprises activating a display of the plurality of interactive elements within the plurality of rows in response to detecting a selection of a fast input request button via the user interface.

11. The method of claim 10, wherein the method further comprises changing an appearance of the fast input request button within the user interface to indicate that the plurality of interactive elements are currently activated.

12. The method of claim 9, wherein the method further comprises detecting a selection of a row from among the plurality of rows via the user interface, and in response displaying a second page of the software application and one or more input fields included in the second page of the software application.

13. The method of claim 12, wherein the method further comprises detecting a selection of an input field from among the one or more input fields included in the second page of the software application, and adding the selected input field to the fast input pop-up window.

14. The method of claim 13, wherein the method further comprises detecting a selection of an additional input field via a third page of the software application, and in response, adding the additional selected input field to the fast input pop-up window which includes the input field from the second page of the software application.

15. The method of claim 9, wherein the method further comprises displaying an indicator within an interactive element which indicates that one or more input fields in the fast input pop-up window is not completed.

16. The method of claim 15, wherein the method further comprises displaying a numeric identifier inside an area of the indicator which indicates a number of input fields that are not completed within the fast input pop-up window.

17. A non-transitory computer-readable medium comprising instructions which when executed by a processor cause a computer to perform a method comprising:
executing a software application, wherein execution of the software application is to perform:
displaying a plurality of rows of data values from columns of a database table via a user interface embedded in a page of the software application;
detecting a request for a fast input submitted via the user interface, and in response to the detected request, displaying a plurality of interactive elements within the plurality of rows of data values on the user interface; and
detecting a selection of an interactive element from among the plurality of interactive elements, and in response, displaying a fast input pop-up window with input fields from one or more other pages of the software application via the user interface, each of the input fields including a mapping or pointer to one or more partitions, tables, columns within an underlying database, each of the input fields having been previously selected for inclusion in the first pop-up window responsive to a user selection.

18. The non-transitory computer-readable medium of claim 17, wherein the displaying the plurality of interactive elements comprises activating a display of the plurality of interactive elements within the plurality of rows in response to detecting a selection of a fast input request button via the user interface.

19. The non-transitory computer-readable medium of claim 18, wherein the method further comprises changing an appearance of the fast input request button within the user interface to indicate that the plurality of interactive elements are currently activated.

20. The non-transitory computer-readable medium of claim 17, wherein the method further comprises detecting a selection of a row from among the plurality of rows via the user interface, and in response displaying a second page of the software application and one or more input fields included in the second page of the software application.

\* \* \* \* \*